W. R. WOODWARD.

LINK MAT.

APPLICATION FILED JUNE 6, 1917.

Reissued Mar. 26, 1918. 14,452.

*Inventor*

William R. Woodward by Wright, Brown, Quinby & Ivey

Attorneys

REISSUED

UNITED STATES PATENT OFFICE.

WILLIAM R. WOODWARD, OF BROCKTON, MASSACHUSETTS, ASSIGNOR, BY MESNE ASSIGNMENTS, TO BROCKTON HEEL COMPANY, INC., OF BROCKTON, MASSACHUSETTS, A CORPORATION OF MASSACHUSETTS.

LINK MAT.

14,452. Specification of Reissued Letters Patent. Reissued Mar. 26, 1918.

Original No. 1,222,707, dated April 17, 1917, Serial No. 134,830, filed December 4, 1916. Application for reissue filed June 6, 1917. Serial No. 173,253.

*To all whom it may concern:*

Be it known that I, WILLIAM R. WOODWARD, a citizen of the United States, residing at Brockton, in the county of Plymouth and State of Massachusetts, have invented new and useful Improvements in Link Mats, of which the following is a specification.

The present invention relates to link mats of the well known type which comprises links of leather or other material strung upon pintle rods, such links being usually formed of several pieces or thicknesses of the leather or other material placed side by side; and the width of the mat being governed by the length of the pintle rods. Mats of this character have frequently caused inconvenience and annoyance to the user on account of the ease with which a corner may be bent up and by the fact that when the corner is thus bent up the endmost pintle rod or possibly the two pintle rods near the end are bent. As these rods are usually of ductile metal, and most commonly of soft iron, they are easily bent, and when once bent by accident remain bent until straightened. As long as this bent condition is retained evidently much inconvenience can be caused by the mat by tripping of persons walking over it, preventing closing of doors, and otherwise.

My invention has for its object to prevent any such effect as that above indicated, by making impossible the bending up of the corner of the mat by any force of magnitude comparable to those which have heretofore caused bending up of the corners of link mats as above mentioned. Briefly stated the invention consists in a stiffening member which is engaged with certain of the links of the mat and is of relatively great strength to resist bending, in comparison with the rods which form the pintles. In the drawings, Figure 1 is a plan view of a portion of a link mat with parts broken away to illustrate the construction of the mat and of that improvement which constitutes my present invention.

Fig. 2 is a sectional view on line 2—2 of Fig. 1.

Figure 1:
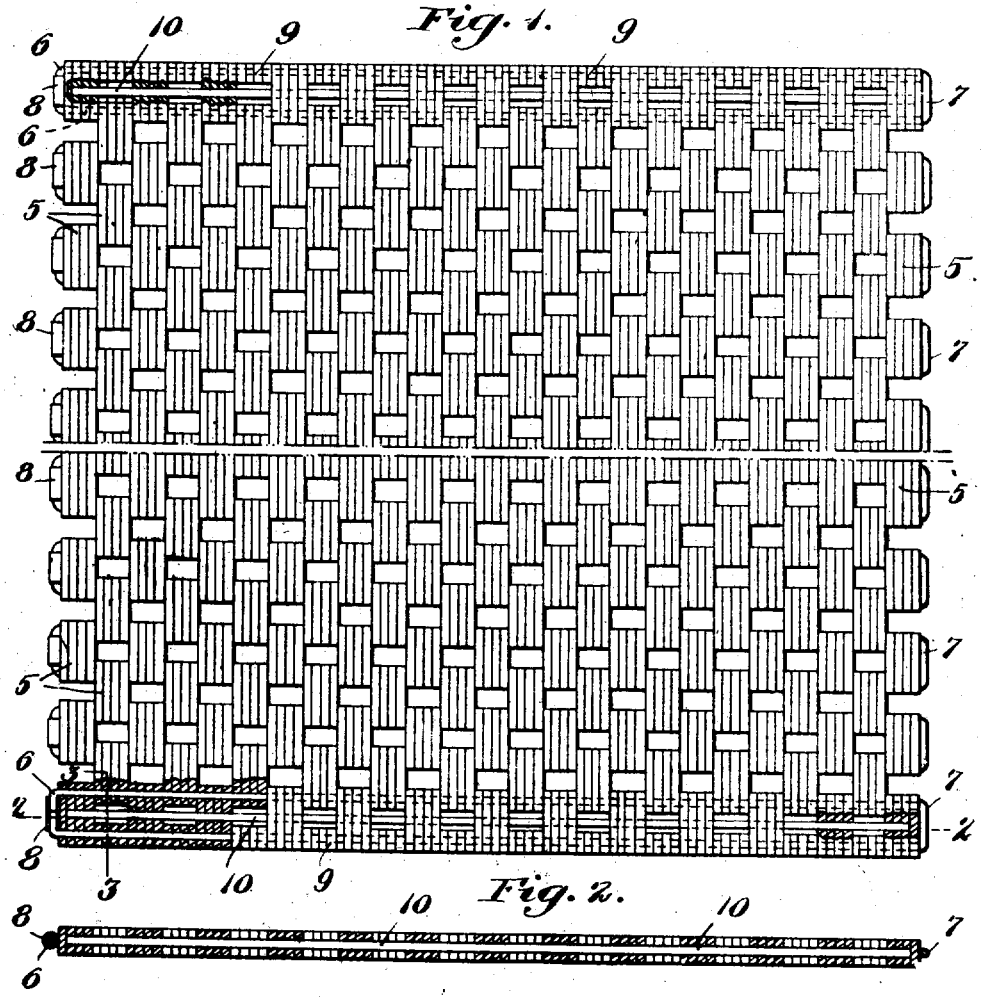
Figure 3:
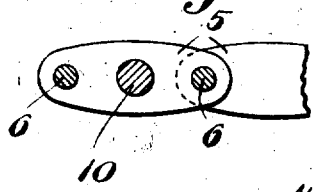
Fig. 3 is a detail view on a larger scale taken through the endmost link of the mat and may be considered as the section on line 3—3 of Fig. 1.

Referring to the drawings the mat as a whole is shown as consisting of links 5 and pintle rods 6. The links are ordinarily made of leather although they may be made of any other suitable material, such as wood, metal, fiber, etc., so far as the present invention is concerned. Ordinarily each link is made of two or more strips or pieces of leather placed side by side as shown. This is the preferred mode of construction where scraps or pieces of sole leather, or material having thickness comparable to that of leather, are used. These links are strung on the pintle rods, each link being thus engaged with two rods and having holes through which the rods are passed, alternate links projecting in opposite directions from the same pintle rod so as to engage respectively with rods on opposite sides of the common pintle. Preferably the pintles are arranged in pairs being connected at one side of the mat by a connecting portion 7, their ends at the opposite side of the mat being bent toward one another and passed into a coupling sleeve 8, this construction giving at the same time a finished appearance and preventing the pintles from becoming disengaged from the links. This effect is secured by making each pair of pintles out of a single rod or wire, bending the same at points near its middle point in the form of an elongated U having relatively very long legs or side members and a short connecting bottom member.

The spaces between the links at the ends of the mat are filled by washers 9 strung on the endmost pintle rods.

This is the construction which has long been in use. It is subject to deformation by reason of the fact that the pintles are relatively small in diameter and easily bent so that it is quite common for mats of this character to be bent or curled up at the corners, or bent or buckled at other points, with consequent liability to trip persons walking over the mat, or to interfere with the closing of a door when the mat is placed next to a door sill, or otherwise to cause inconvenience and annoyance.

The improvement which constitutes my present invention consists in a reinforce or stiffener 10 which is applied to the mat in such a way and in such locations as to oppose bending up of the corners, and buckling or bending of other parts of the mat. In its preferred form this stiffener is a rod which is passed through the endmost links between the endmost pintle rod 6 and the next adjacent pintle.

The reinforcing rod 10 may be and preferably is materially greater in diameter than the pintle rods. In one form of mat which I have constructed the ratio of the reinforce to the pintle is as 25 to 10; although in the drawings the pintles are shown larger in proportion for clearness. I may employ rods of tempered steel for the stiffeners in cases where great additional stiffness is required. However, I do not limit the invention as to the material used for the stiffening rods or even to the greater diameter of these rods; neither do I limit the invention to rods as distinguished from other types of stiffening or reinforcing members which might be used to the same effect.

Whatever may be the form, proportions, or mechanical properties of the reinforcing members, their effect is to increase greatly the resistance which is offered to bending of the mat at the corners transversely or diagonally, and therefore to overcome the objectionable effect which I have previously described as inherent in link mats as heretofore produced. Where the reinforcement is a rod materially greater in diameter than the pintles, or is of hardened and tempered steel, the resistance to bending is materially increased and is made great enough absolutely to prevent such bending as the result of the casual accidents and forces which have been the cause of the bending of the mats heretofore made.

What I claim and desire to secure by Letters Patent is:

1. A link mat comprising pintle rods and links strung upon said rods, in combination with a reinforcing rod passed through the endmost links of the mat between the endmost pintle rod and the next adjacent pintle.

2. A mat comprising interconnected longitudinally extending links and transversely extending pintle rods, and a stiffening member arranged in a position intermediate the pintle rods of the endmost pair, engaged with the links of the mat and having strength to resist distortion in a direction transverse to the plane of the mat.

3. A link mat comprising longitudinally extending links and transversely extending pintles, each passing through the overlapping ends of two series of such links, in combination with a stiffening member having strength to resist distortion in a direction transverse to the plane of the mat arranged substantially parallel to two of said pintles in a position intermediate the same and in engagement with the links which cross the space between said two pintles, whereby to prevent bending and buckling of the mat.

4. A link mat comprising longitudinally extending links and transversely extending pintles, each passing through the overlapping ends of two series of such links, in combination with a stiffening rod passing through a series of the links between two of said pintles.

5. A link mat composed of structurally distinct and separate links arranged and spaced apart in longitudinal lines, with the links in each line overlapping at their ends the contiguous links in the adjacent lines, transverse pintle rods extending from side to side of the mat passing through the overlapping ends of the transversely alined links, and rods having substantially greater stiffness than said pintle rods passing through the transversely alined links between certain of said pintle rods.

In testimony whereof I have affixed my signature.

WILLIAM R. WOODWARD.